United States Patent [19]

Scragg et al.

[11] 4,055,165
[45] Oct. 25, 1977

[54] CARBONACEOUS BOILER

[76] Inventors: Robert L. Scragg; Alfred B. Parker, both of 2937 SW. 27th Ave., Miami, Fla. 33133

[21] Appl. No.: 534,588

[22] Filed: Dec. 19, 1974

[51] Int. Cl.[2] .............................................. F24H 7/00
[52] U.S. Cl. ............................... 126/400; 122/367 R; 122/367 C; 126/271; 219/388; 431/328
[58] Field of Search ..................... 126/270, 271, 400; 122/367 R, 367 C, 33; 431/328, 329; 219/388; 165/18

[56] References Cited

U.S. PATENT DOCUMENTS

| | | | |
|---|---|---|---|
| 3,211,133 | 10/1965 | Valyi | 122/33 |
| 3,304,933 | 2/1967 | Bates | 126/400 |
| 3,401,682 | 9/1968 | Jakob | 126/400 |
| 3,780,262 | 12/1973 | Rudd | 126/400 |
| 3,824,064 | 7/1974 | Bratko | 431/328 |

OTHER PUBLICATIONS

Harrison-Walker; Modern Refractory Practice; "Silicon Carbide Refractories" 1961 pp. 134-135.

*Primary Examiner*—Kenneth W. Sprague
*Assistant Examiner*—James C. Yeung
*Attorney, Agent, or Firm*—Cushman, Darby & Cushman

[57] ABSTRACT

A carbonaceous boiler is disclosed which includes a block of impervious, low permeability carbonaceous material having relatively large infrared radiation receiving side surfaces and a relatively narrow depth dimension. In one embodiment a single pass channel is formed in the block in the form of a grid so that liquids or gases passing through the channel absorbs infrared radiation directed onto the side surfaces of the block. In an alternate embodiment the single pass channel is positioned adjacent to a counter flow channel formed within a carbonaceous block to thereby provide heat exchange between the gases or liquids flowing through the single pass channel, the infrared radiation being directed onto the side surface of the carbonaceous block and high temperature waste fluids passing through the counter flow channel. In another embodiment of this invention, a carbonaceous block has one side surface thereof exposed to the infrared radiation provided by natural sunlight, while the other side is exposed to infrared radiation provided by an infrared burner arrangement. In yet another embodiment of this invention, a carbonaceous block has all surfaces thereof exposed to liquids, vapors, and gases contained within a stack, chamber, or vessel, for the purpose of heat exchange.

6 Claims, 4 Drawing Figures

CARBONACEOUS BOILER

BACKGROUND OF THE INVENTION

This invention relates to furnaces and boilers and more specifically relates to furnaces and boilers utilizing impervious, low permeability silicon carbide as a medium for efficiently absorbing infrared radiation.

In processes for heating and vaporizing liquids and gases there are many types of boilers or furnaces that perform specific functions within a well-defined set of parameters such as upper heat limits and pressure levels. All boilers are either directly or indirectly energized by chemical or fossil fuels which may be in the form of liquids, gases or solids. All of these boilers generate pollution and, with the exception of nuclear boilers, are limited to relatively low heat levels and pressure limits. Further, these prior art boilers have been characterized as having a less than optimum efficiency.

Furthermore, in many processes ranging from the debarking of logs in the production of pulp paper and firing furnaces for steel mills to the burning of fuels for internal combustion engines, substantial quantities of waste heat are generated which are never fully utilized. To make use of the emission of waste heat many types of heat exchangers have been developed, an example of which is disclosed in Cushman U.S. Pat. No. 3,404,731. These prior art heat exchangers have a primary purpose of capturing heat from a waste heat source, conducting that heat to a liquid or gas medium which transfers the latent heat absorbed in the exchanger process to another medium. To make such a waste heat exchanger desirable for an end use, the exchanger must have a second medium which can efficiently utilize and convert the waste heat to a useful end.

It is known that carbonaceous materials provide good heat absorption properties and the use of carbonaceous materials in furnaces is well known in the art. For example, in Reys U.S. Pat. No. 3,265,124 there is disclosed a furnace having a plurality of heat exchanger tubes therein which are coated with a graphite material to improve the efficiency of the furnace. Other furnace arrangements have utilized graphite material to cover portions of the surface thereof in order to provide increased heat transfer efficiently.

As is known in the art, carbon materials are typically porous and accordingly have a high premeability. In addition, such carbon and graphite materials are typically pervious so that any furnace utilizing such carbon or graphite materials requires an impervious backing or support structure to provide the necessary strength to withstand pressures developed within the furnace or boiler. More recently, high impervious carbonaceous materials have been developed which exhibit low permeability characteristics. An example of one such material is "KT" silicon carbide manufactured by the Carborundum Corporation, which material has exceedingly high strength characteristics and can operate at temperatures as high as 3000° F in an oxidizing atmosphere and 4200° F in an inert atmosphere. Further, this material is impermeable having a porosity of 0% with an excellent thermal shock resistance characteristic.

It is an object of this invention to provide a carbonaceous boiler or furnace formed of a low permeability, impervious carbonaceous material capable of efficiently converting infrared radiation to heat a gas or liquid material.

It is another object of this invention to provide a carbonaceous boiler/heat exchanger for converting infrared radiation and the heat of waste combustion products to heat a fluid.

It is yet another object of this invention to provide a boiler formed of carbonaceous material which is capable of converting the infrared radiation from natural sunlight and from an artifical source to heat a gas or liquid.

It is yet another object of this invention to provide a carbonaceous boiler formed of a low permeability, impervious carbonaceous material capable of heating and vaporizing liquids and gases in both relatively normal temperature ranges and in superheat and superpressure ranges.

It is yet another object of this invention to provide a carbonaceous boiler formed of a low permeability, impervious carbonaceous material capable of efficiently converting nuclear radiation to heat a gas or liquid material.

It is yet another object of this invention to provide a carbonaceous boiler formed of a low permeability, impervious carbonaceous material capable of utilizing vapor or gas of fuels that produce superheat flames, e.g. hydrogen and acetylene.

It is yet another object of this invention to provide a boiler formed of a carbonaceous material which is capable of heating and vaporizing liquids and gases to the plasma state.

It is yet another object of this invention to provide a boiler formed of a carbonaceous material which is capable of being washed, scrubbed, or scaled without disassembling.

It is another object of this invention to provide a carbonaceous boiler formed of a low permeability, impervious carbonaceous material capable of vaporizing acids, bases, or salts.

SHORT STATEMENT OF THE INVENTION

Accordingly, this invention relates to a carbonaceous boiler which includes a block of impervious, low permeability silicon carbide capable of operating at temperatures in excess of 2000° F, which block has relatively large infrared or higher frequency radiation absorbing side surfaces and a relatively narrow depth dimension. A channel is formed in the block in the form of a grid so that liquid or gases passing through the channel absorb substantially all of the heat energy provided by infrared radiation directed onto the sides of the carbonaceous block. The side surfaces of the carbonaceous block may be exposed to progressively higher infrared or higher frequency radiation levels from bottom to top so that as the fluid progresses through the tube grid, the temperature of the fluid increases progressively and smoothly; for such purposes as, vaporizing low temperature fluorocarbons.

In a second embodiment of the invention of a counter flow block having a counter flow channel therein is positioned adjacent to the fluid conducting channel within the carbonaceous block so that high temperature waste products can be passed through the counter flow channel to thereby exchange heat between the high temperature waste fluid and the fluid being heated by the boiler.

In a third embodiment of this invention; the carbonaceous block of embodiment one is positioned or submerged into a hot gas atmosphere or fluid bath thereby exchanging heat between the gas or fluids within the boiler to those of the surrounding atmosphere.

BRIEF DESCRIPTION OF THE DRAWINGS

Other objects, features and advantages of the present invention will become more fully understood from the following detailed description of the preferred embodiment, the appended claims and the accompanying drawings in which:

DETAILED DESCRIPTION OF THE PREFERRED EMBODIMENT

Figure 1:
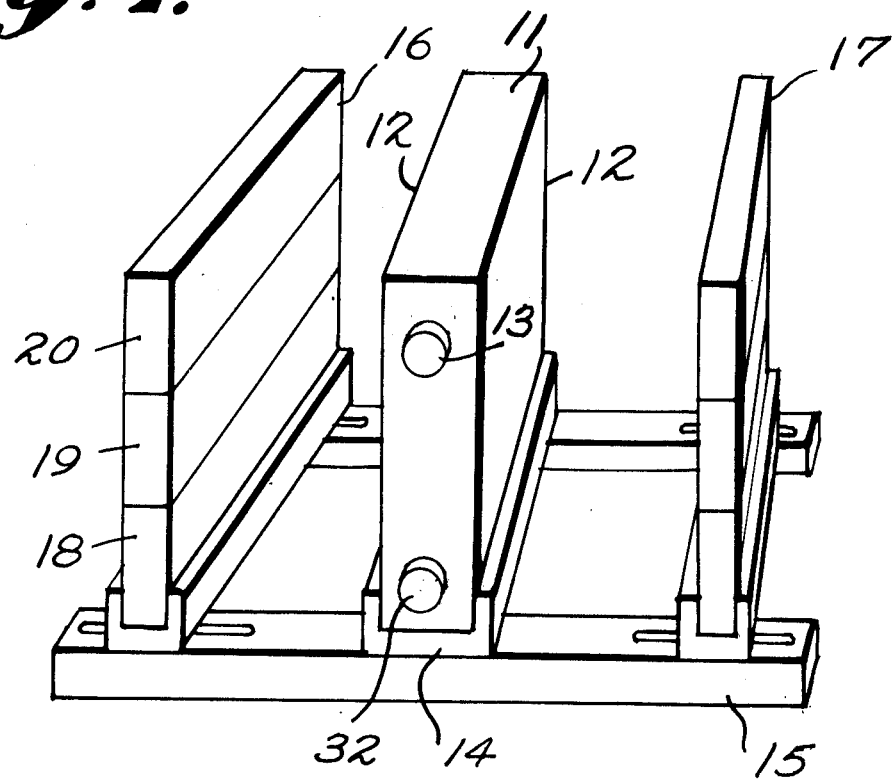
FIG. 1 is a perspective illustration of the preferred embodiment of a carbonaceous boiler of the present invention.

Refer now to FIG. 1 where there is disclosed a perspective view of the preferred embodiment of the present invention. A block of silicon carbide 11 having relatively large side surface areas 12 and having a relatively small or narrow depth dimension is fixedly positioned on a metal mount 14 which in turn is fixedly secured to a point intermediate the ends of a metal frame 15. The carbonaceous block may be formed of any suitable low permeability, impervious graphite or carbon material but in the preferred embodiment, the carbonaceous block is formed of KT silicon carbide which is manufactured by the Carborundum Corporation. Such a block can operate at working temperatures up to 3000° F in an oxidizing atmosphere and up to 4,200° F in an inert atmosphere and has a thermal conductivity in excess of 700 BTU 1 hr./sq.ft./° F/in. In addition, KT silicon carbide is impermeable, has excellent thermal shock characteristics and can contain liquid or gas at pressures in excess of 2,000 psig.

As illustrated, a single pass channel 13 is formed in the carbonaceous block 11 with the single pass channel 13 having a grid structure so that the fluid or gas passing through the channel is exposed to a maximum of the heat energy absorbed by the carbonaceous block at the sides thereof.

To each side of the carbonaceous block are positioned sources of infrared energy 16, 17 which are movable to within one-half inch with respect to the carbonaceous block on the metal frame 15. The sources of infrared energy are shown in schematic form for ease of illustration since such sources are well known in the art. In the preferred embodiment the infrared energy is generated by fossil fuel heating means known in the art. A series of infrared radiation sources may be formed wherein infrared rays of progressively increasing energy are directed onto the block 11 from the bottom thereof to the top. Thus, for example, the infrared source 18 may provide infrared rays which are directed onto the lower portion of the carbonaceous block 11 for heating the fluid passing through channel 13 to a temperature of, for example 500° F. The infrared radiation provided by source 19 may, for example, generate temperatures in the fluid passing through the channel 13 which range between 500° F and 1,000° F while the upper infrared source 20 provides radiation for heating the fluid in channel 13 to a level above 1,000° F. As aforementioned, the infrared sources may be of any suitable type, gas or electric, known in the art for generating the aforementioned or other temperature levels.

Figure 2:
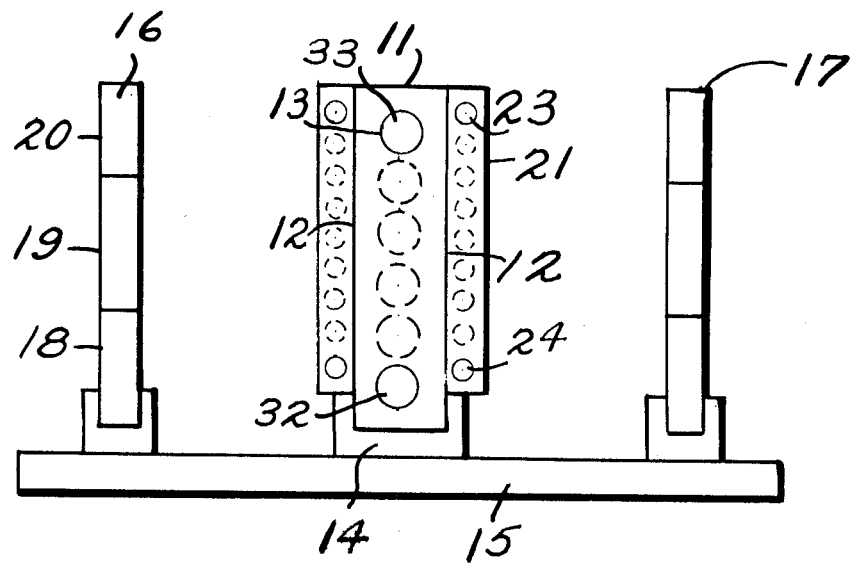
FIG. 2 is an end elevation view of the carbonaceous boiler of FIG. 1 with adjacent counter flow tubular block, constructed of silicon carbide.

Refer now to FIG. 2 which is an end elevation view of the carbonaceous boiler of the present invention. A block of carbonaceous material 11 having a relatively small depth dimension is positioned on a mount 14 which, in turn, is fixedly secured to a frame 15. As illustrated, a single pass, fluid conducting channel 13 is formed in the carbonaceous block 11 and has the form of a grid. Around the carbonaceous block 11 is a counter flow block 21 which has ingress and egress ports 23, 24 which are separate from the ingress and egress ports of the single flow channel 13. The counter flow block 21 is positioned adjacent or proximate to the block 11 so that fluid passing through the counter flow block 21 substantially completely surrounds the block 11 and single flow channel 13. In addition, the counter flow block is positioned adjacent to block 11 so that the channel therein is also in the form of a grid. Thus, high temperature waste products or fluids produced, for example, by nuclear sources to superhigh temperatures, flow through block 21 and exchange heat with the fluid in channel 13. In addition, the high temperature waste fluid absorbs infrared radiation via the medium of the carbonaceous block. Block 21 may be constructed with carbonaceous material.

Figure 3:
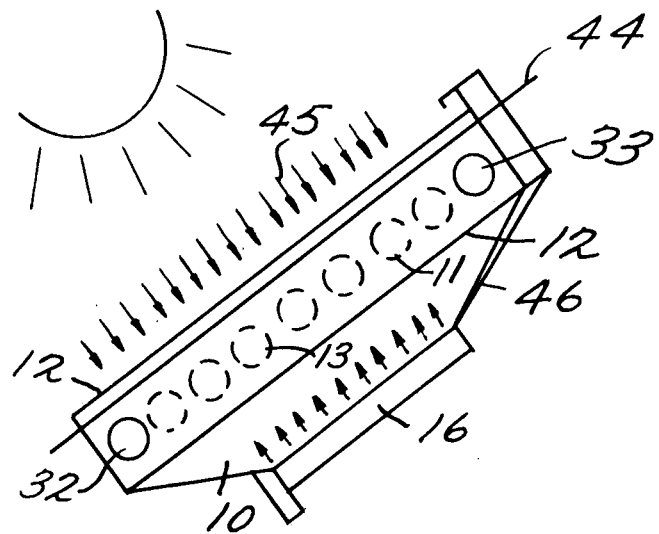
FIG. 3 is a perspective view of the tubular grid structure mounted within a solar/infrared plennum.

Refer now briefly to FIG. 3 which illustrates the single pass carbonaceous boiler mounted within a solar/infrared plennum. As illustrated, the single flow channel 13 is formed as a grid so that fluid flowing through the tube passes inside a substantial portion of the surface of the carbonaceous block exposed to infrared radiation from the sun and the infrared unit contained therein. This provides for a more efficient heating of the fluid passing through the tube. A means for concentrating and directing sunlight onto the surface 11 may be provided if desired. Such means are known in the art and accordingly is not shown herein for ease of illustration.

Figure 4:
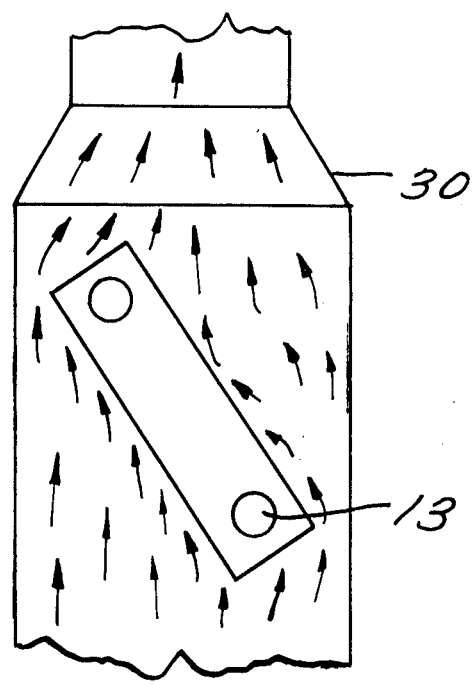
FIG. 4 illustrates a carbonaceous boiler positioned in a hot gas chamber or stack.

Refer now briefly to FIG. 4 which illustrates the single pass carbonaceous boiler mounted within a hot gas stack 30. As illustrated, the single flow channel 13 in carbonaceous block 11 is formed as a grid so that fluid flowing through the tube passes inside a substantial portion of the surface of the carbonaceous block exposed to conducted, convected, and radiated heats within the stack. This provides for an efficient method of utilizing waste heat for heating fluids passing through the tube. The carbonaceous block can be mounted within the stack by any suitable means known in the art. The fluid being heated and/or pressurized may be conducted with respect to the block by any suitable means, such as, for example, tungsten tubing.

Refer now back to FIG. 2 where infrared burners 16 and 17 are shown positioned to each side of the carbonaceous block 11, with the carbonaceous block being generally positioned orthogonally to the direction in which the radiation from the infrared burners impinge thereon.

In operation, liquid or vapor is fed into the single pass channel 13 at the input 32 thereof. The fluid passes upwardly through the block 11 and out the port 33. In the meantime, the infrared radiation from the sources 16 and 17 is transferred to the carbonaceous block 11 and the heat exchanger block 21 by radiation. The energy is efficiently absorbed by the carbonaceous block and is converted into heat energy. This heat energy is, in turn, transferred to the fluid passing through the channel 13.

As was mentioned in connection with the description of FIG. 1, a plurality of individual infrared sources 18-20 may be provided such that the energy provided thereby increases from the bottom of the burners 16 and 17 to the top thereof. Accordingly, the fluid passing through the channel 13 is exposed to increasingly higher heat levels as it passes through the carbonaceous block 11 to thereby smoothly and progressively increase the heat level of the fluid. As the fluid heats up, it begins to expand, rise in pressure, and increase in velocity. As the fluid travels upward in the channel 13 it absorbs more of the latent heat absorbed by the carbonaceous block and continues its expansion until it reaches a desired heat and pressure level and is exhausted via the output port 33. Such a smooth and progressively increasing heat level of the fluid is particularly important in the case where fluorocarbons are being heated since such compounds have a tendency to solidify if the heating thereof is not uniform.

Counter flow blocks 21 receives a heat charge from a primary heat waste exchanger via inlet port 23. As the waste fluid enters the block 21, it begins to radiate latent heat to the liquid or vapor in the channel 13. If the latent heat of the waste fluid is not sufficient to bring the liquid or gas in the channel 13 to the desired heat and pressure level, the infrared burners provide the heat required for heating the waste fluid to the appropriate temperature so that the fluid in channel 13 can be brought to the appropriate temperature and pressure levels.

It should be understood that the infrared burners 16 and 17 can be used merely as a secondary source of heat energy with the high temperature emissions in block 21 providing the primary source of heat. Thus, the infrared burners 16 and 17 can be used to modulate and control the temperature and pressure of not only the fluid in the channel 13 but also the exhaust fluids in block 21.

It should also be understood that while in connection with the preferred embodiment two heat exchanger channels are illustrated with one positioned adjacent to and about the other, only one channel need be utilized with the primary source of radiation then being the infrared burners 16 and 17. In such a case, no waste fluids are coupled to the carbonaceous block. Such an arrangement may be utilized for example when there is no high temperature combustion products or waste fluids available.

In an alternate embodiment of the invention as illustrated in FIG. 3, one of the infrared burners 16 or 17 is not utilized and accordingly, is removed so that the carbonaceous block 11 can be positioned to receive the infrared radiation from the sun. In such a case, the energy receiving surface 12 of the block 11 is positioned at an optimum angle for receiving the maximum quantity of infrared radiation 45 from the sun. Thus, the carbonaceous boiler of the present invention can be utilized, for example, to provide heat for private, commercial, or industrial housing. In the eventuality of inclement weather, the rear energy receiving surface 12 of the block 11 can be heated by means of the infrared burner 16. In this embodiment, the carbonaceous block 11 is supported by means of a support element 44 shown in simplified schematic form. In the case where the carbonaceous block 11 is movably supported so that the surface 12 thereof follows the relative position of the sun, the source 16 is fixed to the block 11 and/or the support means 44 by a suitable support structure 46 so that the source 16 follows movement of the block 11. Thus the radiation directed onto the surface 12' is substantially orthogonal to the plane of the surface 12'.

In another embodiment of the invention, infrared burners are not utilized. They are removed so that the carbonaceous block 11 can be positioned within a stack to receive conducted and convected heats of combusted fuels; positioned in a well or tank to receive conducted or convected heats from heated liquids or vapors. In such case, the surfaces of block 11 are positioned at the optimum angle for receiving subject heats. Thus, the carbonaceous boiler of the present invention can be utilized, for example, to provide heat, steam, or process chemicals in any application where waste heat is available in liquid or gaseous form.

By the present invention there is provided an environmentally and economically acceptable method and apparatus for heating and vaporizing liquids and gases which is both safe, efficient and practical. Because of the high thermal conductivity of the impervious materials forming blocks 11 and 21, exceedingly high thermal efficiencies are provided. Further, because of the nature of carbonaceous materials, i.e., it has the properties of a block body heat absorber, very little conducted-convected, or infrared heat is reflected from or passed through the block 11 and 21 and accordingly elaborate schemes for minimizing heat loss due to reflection or infrared transparency is obviated.

While the preferred embodiment of applicant's invention has been disclosed, it should be appreciated that there may be other alternate embodiments of applicants' invention which fall within the spirit and scope of the invention as defined by the appended claims.

What is claimed is:

1. A boiler comprising a block of low permeability, impervious silicon carbide having relatively large radiation receiving side surfaces and a relatively small depth dimension, a first fluid conducting channel formed in said block in the form of a grid so that said channel passes in proximity to a substantial portion of said radiation receiving sides of said block, a counter flow heat exchanger block positioned proximate said channel in said block, said counter flow block having a second channel for conducting a high temperature fluid in said heat exchanger block in the opposite direction to the flow of fluid in said first fluid conducting channel to thereby exchange heat with the fluid in said first conducting block, and means for directing infrared radiation onto at least one of said radiation receiving side surfaces of said block, said block efficiently absorbing said radiation and conducting said absorbed radiation energy to said channel to heat the fluid passing therethrough.

2. The boiler of claim 1 wherein said silicon carbide block comprises KT silicon carbide.

3. The boiler of claim 1 wherein said means for directing said infrared radiation onto said block comprises means for generating increasingly higher energy infrared raidation from the bottom of said block to the top thereof to thereby progressively increase the temperature and pressure of the fluid passing through said channel as said fluid flows upwardly through said channel to the top thereof.

4. The boiler of claim 3 wherein said silicon carbide block heats said fluid conducted in said channel to a maximum temperature of about 3,000° F and to a maximum pressure of about 2000 psig.

5. The new use of low permeability, impervious silicon carbide comprising the steps of:

forming said low permeability, impervious silicon carbide into a block having relatively large infra-red radiation receiving side surfaces and a relatively small depth dimension, forming a first fluid conducting channel in said block in the form of a grid so that said channel passes in proximity to a substantial portion of said radiation receiving side surfaces of said silicon carbide block;

positioning at least one counter flow heat exchanger block proximate to said first fluid conducting channel in said block of silicon carbide, said counterflow block having a second fluid conducting channel therein, directing infra-red radiation onto at least one of said radiation receiving side surfaces of said block, said block efficiently absorbing said radiation energy and conducting said absorbed radiation energy to said channel to heat fluid passing therethrough, and passing a high temperature fluid through said counterflow block in a direction opposite to the flow of said fluid in said first channel, thereby exchanging heat with the fluid in said first channel.

6. The new use of silicon carbide of claim 5 wherein said silicon carbide comprises KT silicon carbide.

* * * * *